Dec. 20, 1955 G. M. DUPUY 2,727,528
VALVED COUPLER MECHANISM AND INSERT MEANS
Filed Jan. 26, 1951 4 Sheets-Sheet 1
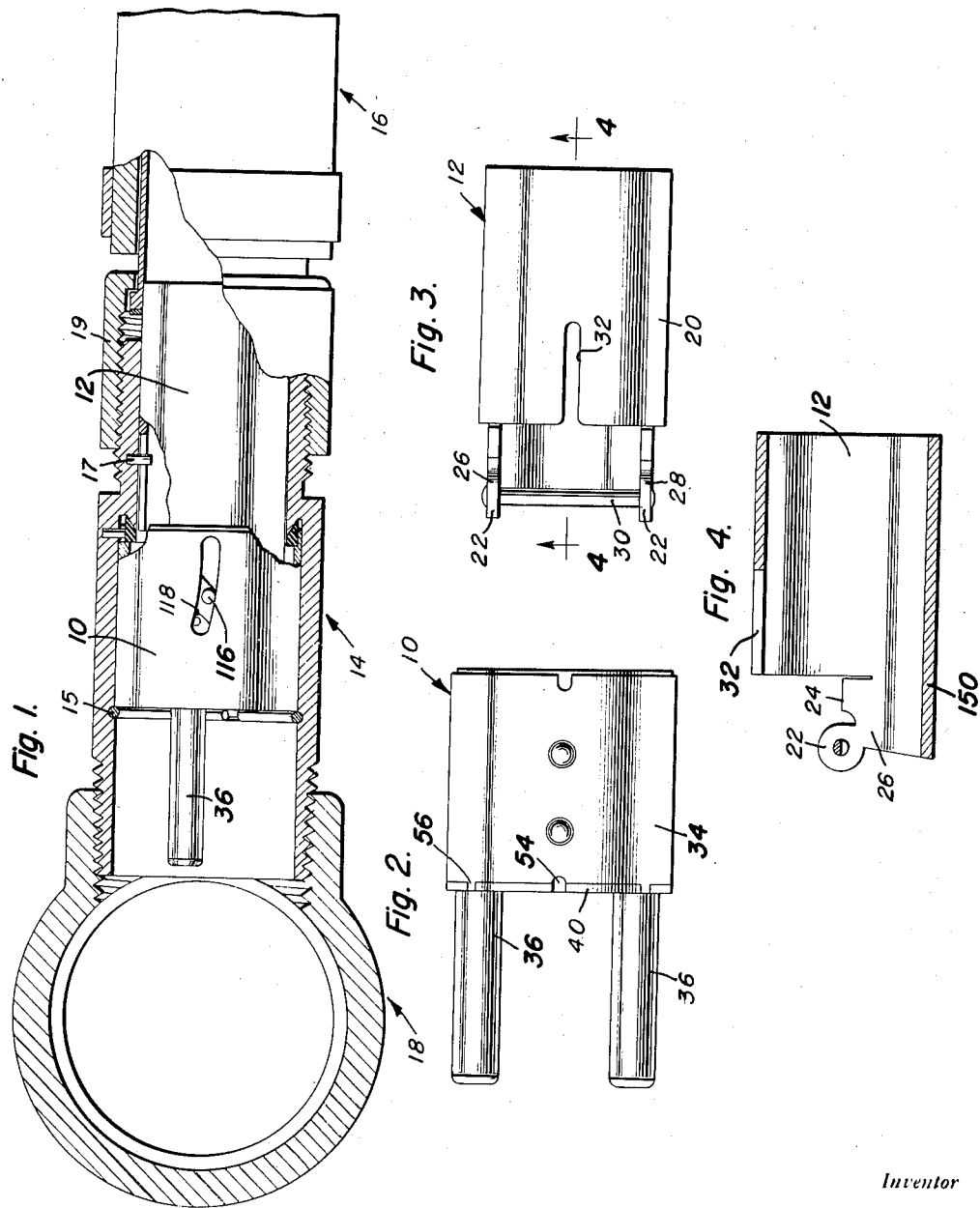
Inventor
Guillaume M. Dupuy Dec. 20, 1955  G. M. DUPUY  2,727,528
VALVED COUPLER MECHANISM AND INSERT MEANS
Filed Jan. 26, 1951  4 Sheets-Sheet 2
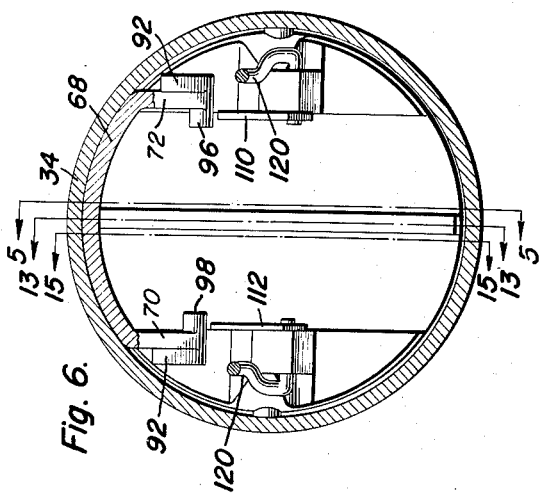
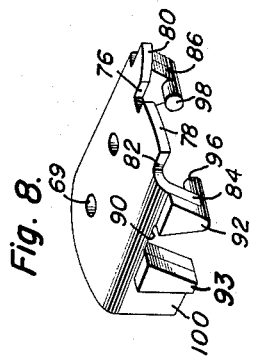
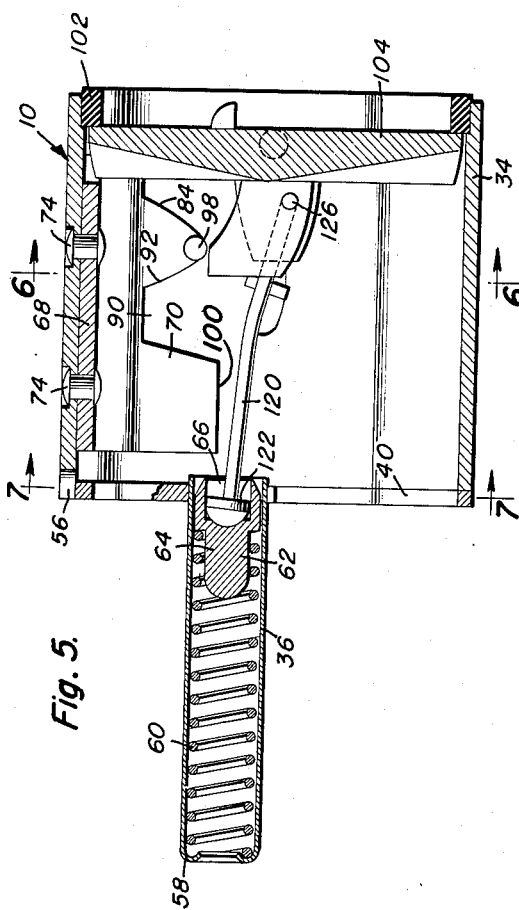
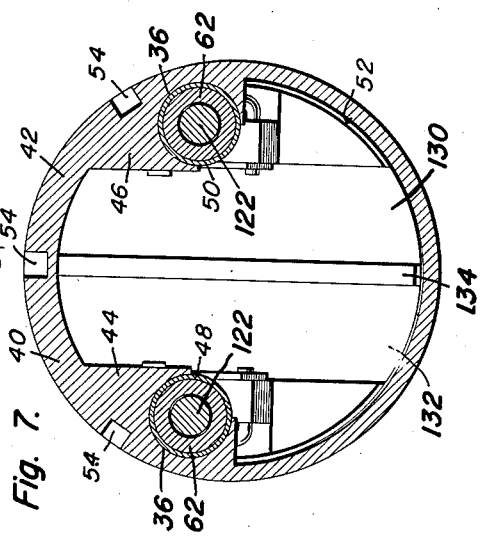
Inventor
Guillaume M. Dupuy
By *Clarence A. O'Brien and Harvey B. Jacobson*
Attorneys Dec. 20, 1955 G. M. DUPUY 2,727,528
VALVED COUPLER MECHANISM AND INSERT MEANS
Filed Jan. 26, 1951 4 Sheets-Sheet 3
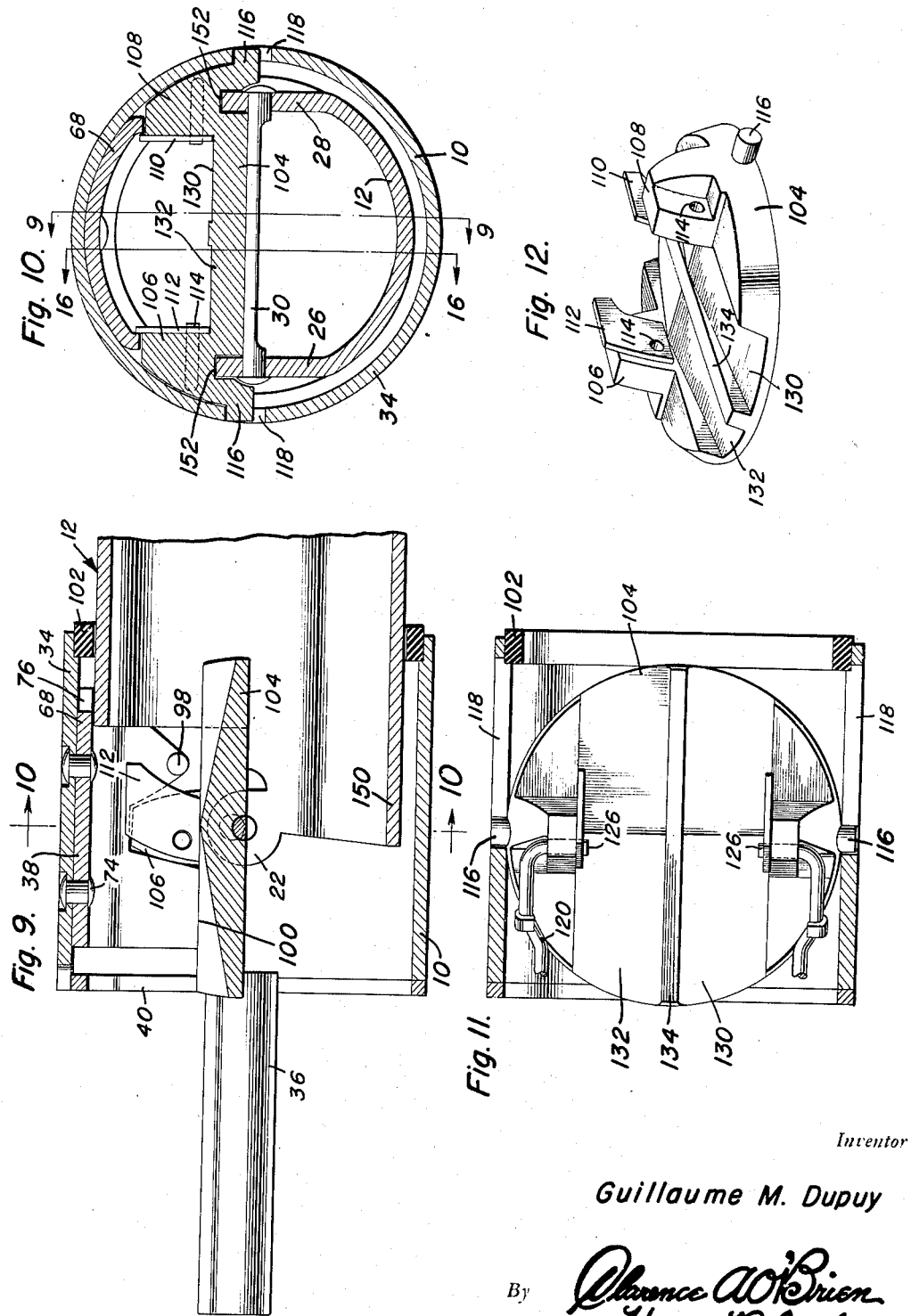
Inventor
Guillaume M. Dupuy
By Clarence A. O'Brien
and Harvey B. Jacobson
Attorneys

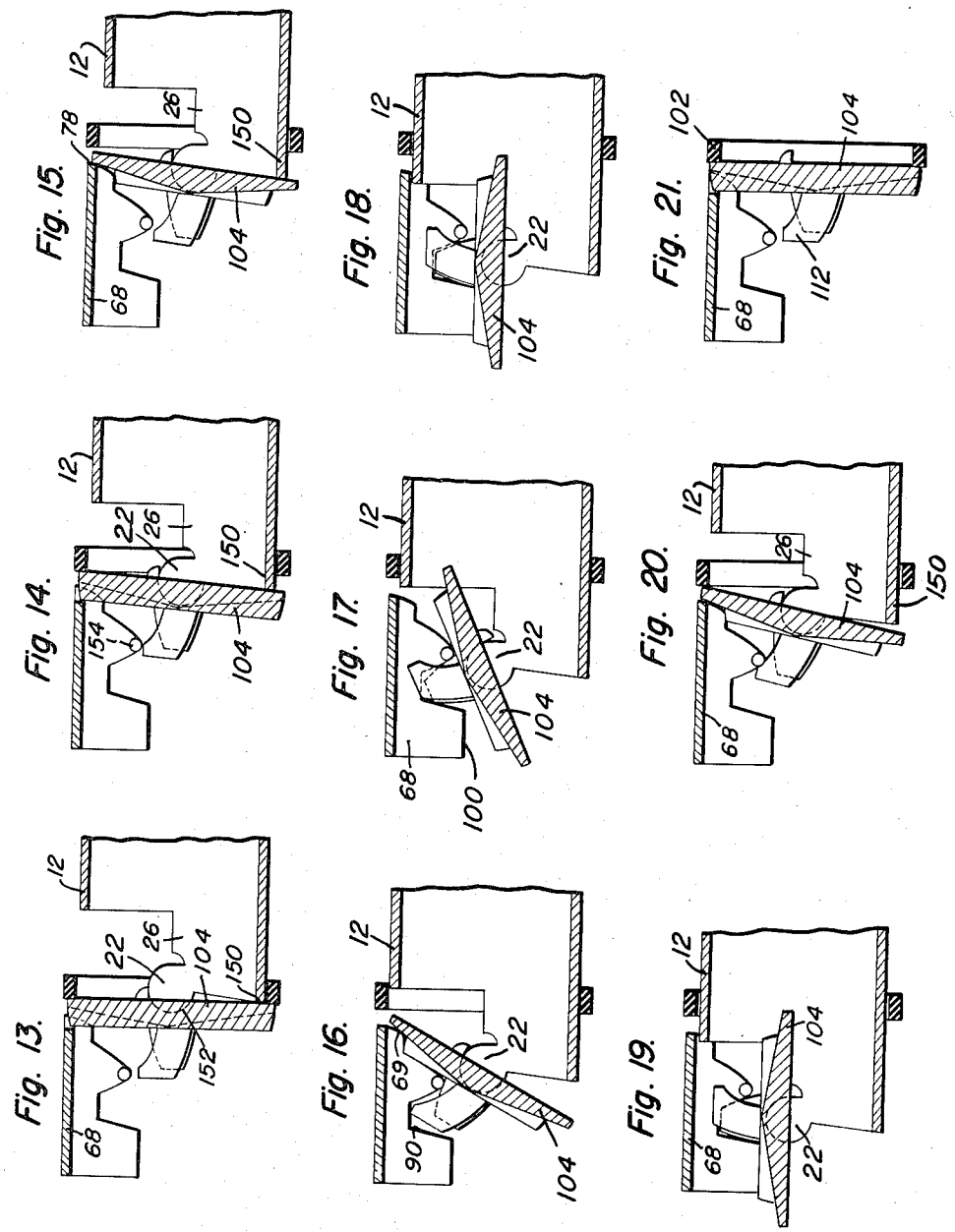

United States Patent Office 2,727,528
Patented Dec. 20, 1955

2,727,528

VALVED COUPLER MECHANISM AND INSERT MEANS

Guillaume M. Dupuy, Tangier, Morocco

Application January 26, 1951, Serial No. 207,997

3 Claims. (Cl. 137—454.2)

The present invention relates to improvements in valved pipe fittings and the like which are particularly employed as hose couplers and wherein a male insert is provided in one conduit section for cooperation with a female insert in a second conduit section. The present application constitutes a continuation-in-part of my co-pending application, now Patent No. 2,641,485, granted June 9, 1953, for Valved Pipe Fitting.

It is an object of the present invention to provide an improved receding and rocking valve mechanism over the valved pipe fitting of the above patent application and wherein the improvements provide for longer life of the mechanism and wherein the improvements constitute safety features for increasing the reliability of operation over my previously mentioned valved pipe fitting of my prior patent.

Further objects of the present invention are to provide such valved coupler means that are particularly adapted for insert construction, thereby resulting in compact constructions and wherein the insert means may be of expendible character.

Still another object of the present invention is to provide an assembly which is so arranged that the operating parts afford visual support whereby the valved mechanism becomes a self-contained insert for mounting in a conduit section or the like.

It is still a further object of the present invention to provide a mechanism of the insert-cartridge type whereby the insert may be employed with a great variety of pipe fittings, couplers, vessels, etc., thereby making possible a higher degree of standardization, thus increasing the possibility of mass producing the inserts and thereby reducing the cost.

Although the present insert construction appears to present a greater obstruction to the flow of fluid therethrough as compared to the valved pipe fitting of my prior patent, it will be observed that the insert construction requires a lesser outside diameter in its entirety with the conduit section whereby the opening through the insert is relatively larger in proportion to the conduit opening. Thus, the opening through the insert-type of mechanism will be greater than the opening possible through the valved mechanism of my prior patent when employed in conduits of similar cross-sectional area.

Various other objects and advantages will become apparent from the detailed description to follow. The best form in which I have contemplated applying my invention is clearly illustrated in the accompanying drawings, wherein:

Figure 1 is a sectional view, parts being shown in elevation, through a pair of conduit sections attached to a main line and having the valved coupler mechanism and insert means of the present invention inserted therein for providing flow through the conduit sections;

Figure 2 is a detailed view of the female insert;

Figure 3 is a detailed view of the male insert;

Figure 4 is a vertical longitudinal sectional view taken substantially along the plane of line 4—4 of Figure 3;

Figure 5 is a vertical longitudinal sectional view taken substantially along the plane of line 5—5 of Figure 6;

Figure 6 is a vertical transverse sectional view taken substantially along the plane of line 6—6 of Figure 5;

Figure 7 is a vertical transverse sectional view taken substantially along the plane of line 7—7 of Figure 5;

Figure 8 is a detail perspective view of the cam plate employed in conjunction with the female insert of the present invention;

Figure 9 is a longitudinal sectional view taken substantially along the plane of line 9—9 of Figure 10;

Figure 10 is a vertical transverse sectional view taken substantially along the plane of line 10—10 of Figure 9;

Figure 11 is a horizontal longitudinal sectional view showing the valve in its open position;

Figure 12 is a detail perspective view of the valve employed in conjunction with the female insert of the present invention;

Figures 13, 14 and 21 are vertical longitudinal sectional diagrammatic views taken substantially along the plane of line 13—13 of Figure 6;

Figures 15 and 20 are vertical longitudinal sectional diagrammatic views taken substantially along the plane of 15—15 of Figure 6; and Figures 16, 17, 18 and 19 are vertical longitudinal sectional diagrammatic views taken substantially along the plane of line 16—16 of Figure 10.

Referring more particularly to the drawings, wherein like numerals designate like parts throughout, the numeral 10 designates generally the female insert while the numeral 12 designates generally the male insert, the numerals 14 and 16 represent the first and second conduit sections while the numeral 18 designates generally a main line of supply for a plurality of pairs of conduit sections such as 14 and 16.

The male insert 12 is substantially the same as that described in my prior patent, with the exception that the portions of the tube 20, see Figures 3 and 4, on which the forwardly projecting lugs 22 and valve supporting stops 24 are formed, are made substantially plain, parallel surfaces, so that the inner distance between the lugs 22 or the stops 24, as seen in Figure 3, is slightly less than the bore of the tube 20. In other words, the portions 26 and 28 of the tube 20 are inwardly angulated and flat with a reinforcing cross member 30 joining the lugs 22. The male insert 12 is also formed with an elongated slot 32 which is employed as an indexing means.

The female insert 10 is best seen in Figures 2, 5, 6 and 9 through 11, and comprises a cylindrical shell 34, constituting the main body, and two rearwardly projecting cylinders 36 and 38 of reduced cross-sectional area, the pair of cylinders 36 and 38 being secured to the back plate 40, which is in turn secured to the cylindrical shell 34.

Figure 7 shows the plate 40 as provided with a rim portion 42 and a pair of inwardly extending portions 44 and 46 having openings 48 and 50 therethrough and for receiving the inner ends of the two, identically constructed cylinders 36. The plate 40 has an enlarged opening 52 for fluid flow through the entire insert. The plate 40 is also provided with a plurality of longitudinal external notches 54 which are adapted to receive projections 56, see Figure 5, rearwardly and axially extending from the cylindrical shell 34. The uppermost notch 54 is employed as an indexing notch to engage a suitable projection for fixedly positioning the insert 10 within a coupler section such as section 14.

The two cylinders 36, see Figure 5, are of open ended construction with one end portion turned in at 58 to provide a spring seat for the coil spring 60. The opposite end of each of the cylinders 36 reciprocably receives a plunger 62 which is outwardly urged by the coil spring 60. The plunger 62 has a reduced diameter portion 64 which is encircled by a portion of the coil spring 60 and the opposite end portion of the plunger 62 is formed with a recess 66 for a purpose to be hereinafter described.

Disposed within the cylindrical shell 34 and secured thereto is a plate 68, see Figure 8, of arcuate form and having substantially parallel side flanges or walls 70 and 72. The arcuate portion of the plate 68 is in close engagement with the internal surface of the shell 34 and permanently fastened thereto, as by rivets 74.

As best seen in Figure 8, the arcuate plate 68 is provided with a medially and axially extending recess 76, for a purpose to be hereinafter described, and an outwardly and rearwardly extending pair of cam surfaces 78 and 80 extending from the recess 76 and terminating in a rearwardly projecting notch 82 at each side of the plate. Continuing from the notched portions 82, and extending downwardly along the forward section of the parallel flanges 70 and 72, are a pair of curved camming surfaces 84 and 86. The flanges 70 and 72 are also provided with cutout portions which are substantially of the form of a rack tooth at 90 and 92. The flanges 70 and 72 have integrally secured thereto the cam elements 93 at opposite sides of the recessed portions 90 for providing additional cam surface for taking up the wear. Pins 96 and 98 extend inwardly from the flanges 70 and 72 for a purpose to be hereinafter described.

Rearwardly of the recesses 90, the downwardly projecting edges of the flanges provide flat surfaces 100 which constitute supporting surfaces for receiving the valve when in its upper and open position as shown in Figures 9, 18 and 19.

The cylindrical shell 34 has secured therein an annular valve seat 102 against which the valve 104 is adapted to be resiliently urged.

The valve 104 as best seen in Figure 12, has an outside diameter which is slightly less than the bore of the cylindrical shell 34 to provide a working clearance. The differences which exist between the valve element 104 of the present invention and that of the prior patent are that the lugs 106 and 108 integrally formed with the back side of the valve 104 are in the form of gear teeth for cooperation in the recesses 90 of the arcuate plate 68. Cam plates 110 and 112 are secured to the inner faces of the lugs 108 and 106 and are adapted to engage the inwardly extending pins 96 and 98, as seen best in Figure 5 for controlling the initial movement of the valve 104 towards its open position. Openings 114 are formed through the cam plates 110 and 112 and the lugs 106 and 108 for a purpose to be hereinafter described. The valve 104 is also provided with a pair of outwardly extending lugs 116 which are adapted to be received in the arcuated elongated slots 118 formed in the shell 34.

The means for resiliently supporting the valve 104 is comprised of a pair of link arms 120, see Figure 5, which are of angulated construction and have their free ends provided with enlarged heads 122 for positioning within the recesses 66 on the plungers 62. The opposite ends 126 of the link arms 120 are angulated for positioning within the openings 114 of the valve 104, as shown in Figures 5 and 11, for pivoting support of the valve disk.

Looking once again at Figure 12, the back side of the valve disk 104 will be seen as having a pair of faces 130 and 132 divided by a longitudinally extending ridge 134, the faces 130 and 132 tapering to a thickened portion at the central part of the valve disk and whereby the fluid flow past the valve disk will be substantially streamlined.

The operation of the valved coupler mechanism and insert means is best shown in Figures 13 through 21 as the valve moves from closed position to open position and then again back to closed position. In Figure 13, the valve 104 is seated and the male insert 12 of the conduit section 16 has advanced so that the forward projecting edge 150 is contacting the lower part of the valve disk 104.

In Figure 14, the male insert has moved forwardly so that the valve is pivoted slightly from the annular seating ring 102, the upper portion of the valve remaining in abutment with the seat. The fulcrum lugs 22 are engaged in the arcuate slots 152, see Figure 9, in the face of the valve disk. The flat portions of the camming plates 110 and 112 are disposed below the lugs 154.

Figure 15 shows the movement of the male insert farther into the female insert with the valve disk 104 supported on the lugs 22 and the forward edge 150. The camming surfaces 78 and 80 are now in abutment with the backside of the upper portion of the valve disk 104.

Figure 16 shows the valve disk 104 beginning its pivoting movement about the lugs 22 the cam teeth 106 and 108 beginning to engage in the cam recesses 90 of the arcuate plate 68. The backside of the valve disk 104 is also engaged by the forward end of the arcuate plate 68 at 69.

In Figure 17, the movement has progressed substantially farther and the valve disk is almost to its open position, with the cam lugs 106 and 108 almost completely received within the recesses 90. In Figure 18, the valve has reached the full open position and has its back face resting against the supporting surface 100.

In Figure 19, the closing movement has commenced although the valve disk remains in substantially a horizontal position. The only movement which does occur is the axial movement of the valve and the lugs 106 and 108 within the recesses 90.

In Figure 20 the male insert has been retracted a considerable distance and the cam plates 110 and 112 are now engaged with the inwardly extending lugs 154, thereby effecting pivoting movement of the valve disk about the lugs 22. Figure 21 shows the completed retraction of the male element with the valve disk 104 again seated against the annular seat and held thereagainst by means of the resilient supporting means hereinabove described.

In the arrangement shown in Figure 1, it will be seen that the female insert 10 is secured within the first conduit section 14 by means of the retaining ring 15, the insert being held from rotation by means of a pin or the like engaged in the recess 56. The male insert 12 is disposed within the second conduit section 16 and held from rotation therein by means of the pin 17 engaged in the slot 32. A coupling element 19 is provided for securing the pair of conduit sections 14 and 16 together and for maintaining the first and second inserts in cooperation with each other to maintain the valve in its open position.

In view of the foregoing description, taken in conjunction with the drawings, it is believed that a device has been provided which will accomplish all of the objects hereinabove set forth.

Having described the invention, what is claimed as new is:

1. In a valved coupling assembly, an insert, a valve support and a valve seat in said insert, a valve movably mounted in said insert between said support and said seat for cooperation with said support in open position and said seat in closed position, said insert including a cylindrical shell having a pair of hollow cylinders secured thereto and projecting rearwardly from the end of said shell opposite the end containing the valve seat, each of said cylinders having a resilient means supported therein, a pair of link means movably disposed within the cylindrical shell one end of each of said link means being movably connected to one side of said valve, said resilient means including a coil spring disposed in each of said hollow cylinders, a plunger in each of said cylinders and engaged by said coil springs, said link means being engaged by said plungers and maintaining said valve in resilient engagement with said seat, each of said plungers having a recessed end receiving the other end of said link means.

2. In a valved coupling assembly, an insert, a valve support and a valve seat in said insert for cooperation with said support in open position and said seat in closed position, said insert including a cylindrical shell having a pair of hollow cylinders secured thereto and projecting rearwardly from the end of said shell opposite the end containing the valve seat, each of said cylinders having a resilient means supported therein, a pair of link means movably disposed within the cylindrical shell one end of each of said link means being movably connected to one side of said valve, said resilient means including a coil spring disposed in each of said hollow cylinders, a plunger in each of said cylinders and engaged by said coil springs, said link means being engaged by said plungers and maintaining said valve in resilient engagement with said seat, each of said plungers having a recessed end receiving the other end of said link means, each of said link means being comprised of an elongated link arm having an enlarged head disposed in said recessed ends of said plungers, the opposing ends of said link arms being angulated and pivotally and supportingly connected to opposite sides of said valve.

3. In a valved coupler mechanism and insert means for conduit sections, an insert having a valve support and an annular valve seat, a valve movably mounted in said insert between said support and said seat, said housing having opposed, elongated slots and said valve having outwardly extending lugs received in said slots floatingly supporting said valve in said insert, means secured to said insert resiliently engaging said valve for urging the valve towards said seat, said valve having means adapted to be engaged by an operating means for displacing said valve from said seat, said insert including a cylindrical shell portion having a pair of rearwardly projecting hollow cylinders secured thereto, each of said cylinders having a resilient means supported therein, a pair of link means movably disposed within the cylindrical shell and engaged by said resilient means, each of said link means being connected to one side of said valve and supporting the same in resilient engagement with said seat.

References Cited in the file of this patent
UNITED STATES PATENTS

| | | |
|---|---|---|
| 706,884 | Beebe | Aug. 12, 1908 |
| 976,647 | Friedman | Nov. 22, 1910 |
| 1,115,945 | Kunz | Nov. 3, 1914 |
| 1,818,508 | Scott | Aug. 11, 1931 |
| 2,492,271 | Cox et al. | Dec. 27, 1949 |
| 2,641,485 | Dupuy | June 9, 1953 |

FOREIGN PATENTS

| | | |
|---|---|---|
| 2,870 | Great Britain | of 1867 |
| 539,014 | Great Britain | Aug. 25, 1941 |